United States Patent [19]

Fuller et al.

[11] 4,075,101

[45] Feb. 21, 1978

[54] APPARATUSES FOR FLUIDIZING A FILTER MEDIA PLUG

[75] Inventors: Matthew H. Fuller, Richmond, Va.; William R. Deever, Beaumont, Tex.

[73] Assignee: Texaco Inc., New York, N.Y.

[21] Appl. No.: 697,293

[22] Filed: June 17, 1976

Related U.S. Application Data

[63] Continuation-in-part of Ser. No. 600,259, July 30, 1975, abandoned.

[51] Int. Cl.² .............................................. B01D 23/24
[52] U.S. Cl. ...................................... 210/275; 55/390
[58] Field of Search ................................ 210/274–275, 210/123, 31 R; 55/390

[56] References Cited

U.S. PATENT DOCUMENTS

| 384,539 | 6/1888 | Olphant | 210/274 |
|---|---|---|---|
| 961,180 | 6/1910 | Utley | 210/274 |
| 2,309,916 | 2/1943 | Palmer | 210/123 |
| 2,789,696 | 4/1957 | Jahnig et al. | 210/80 |
| 2,992,986 | 7/1961 | Ingram | 210/17 |

FOREIGN PATENT DOCUMENTS 1,009,439  5/1952  France ................................ 55/390

Primary Examiner—Frank A. Spear, Jr.
Assistant Examiner—E. Rollins Gross
Attorney, Agent, or Firm—Carl G. Ries; Thomas H. Whaley; Theron H. Nichols

[57] ABSTRACT

Two vertical flow filters for carrying out various methods for rapidly fluidizing a plug are disclosed.

An apparatus comprises a vertical elongated granular media filter having vertically spaced apart plug-breaking-up jets on one side from top to bottom for ejecting high pressure fluid horizontally at the plug for fluidizing it, one portion at a time, starting either at the top or the bottom of the filter. The second apparatus comprises a horizontal cylindrical elongated granular media filter having vertically spaced apart groups of jets on both sides, the jets of each group being in horizontal rows on two opposite sides whereby each successive horizontal row, including both rows on each horizontal plane through the filter, breaks up its respective portion of the plug, starting either at the bottom and working up or starting at the top and working down.

13 Claims, 5 Drawing Figures

APPARATUSES FOR FLUIDIZING A FILTER MEDIA PLUG

This is a continuation-in-part of application Ser. No. 600,259, filed July 30, 1975, now abandoned.

BACKGROUND OF THE INVENTION

Fluidizing granular media filters for backwash operation becomes a problem as filter media has a tendency to lift and rise as a plug rather than as discrete particles. Past attempts to fluidize the plug have been injecting air straight up from the bottom or sideways, protruding solid rods down from the top, and utilizing vibrators for breaking up and fluidizing the plug. A few prior filters are disclosed in U.S. Pat. Nos. 384,539; 961,180; 2,309,916; 2,789,696; 2,992,986; and French Pat. No. 1,009,439 of Mar. 12, 1952; each of which has its own different method for filtering and backwashing. Likewise, none of the above disclosed filters has the problem of breaking up its plug, if one should form, much less disclose a plug-breaking-up means or high velocity, narrow stream nozzle as distinguished from a low pressure, low volume, spray or fluid bed nozzle.

OBJECTS OF THE INVENTION

A primary object of this invention is to provide a rapid fluidizing granular media vertical filter in which a plug of filter media may form and is required to be rapidly broken up and fluidized.

A further object of this invention is to provide a vertical downward flow filter for rapidly fluidizing a plug of filter media therein having high pressure fluid jets positioned at 90° to the longitudinal axis of the plug for breaking up the lower end portion of the plug, another jet parallel to and above the first jet for injecting another high pressure fluid on the plug for breaking up the next lower portion of the plug, and successive and consecutive high pressure fluid jets positioned above each other for continuing injecting at the plug until all of the plug is broken up and fluidized.

A still further object of this invention is to provide a rapid fluidizing and granular media vertical filter in which the plug of filter media forms and is required to be rapidly broken up and fluidized, including a vertical cylindrical chamber having a vertical row of jet nozzles on one side and means for ejecting high pressure liquid jets from a nozzle at one end of the plug at 90° thereto, from the individual nozzles in succession starting at either one end of the plug or the other and continuing to the other plug end to rapidly break up and fluidize the complete plug.

A further object of this invention is to provide a rapid fluidizing and granular media horizontal cylindrical filter in which the plug of filter media forms and is required to be rapidly broken up and fluidized, including a horizontal cylindrical chamber having a plurality of horizontal rows of jet nozzles on both sides and means for ejecting high pressure liquid jets from one horizontal row of jets on each side, as the lower row for example, at the lower horizontal portion of the plug at 90° thereto, from the rows of nozzles in succession starting at either the bottom or top of the plug and continuing through the plug to the top or bottom, respectively, of the plug to rapidly break up and fluidize the complete plug.

Still another object of this invention is to provide a rapid fluidizing granular media vertical and plugbreaking-up filter that is easy to operate, is of simple configuration, and is economical to construct and assemble.

Other objects and various advantages of the disclosed rapid fluidizing granular media vertical filter will be apparent from the following detailed description, together with the accompanying drawings, submitted for purposes of illustration only and not intended to define the scope of the invention, reference being had for that purpose to the subjoined claims.

BRIEF DESCRIPTION OF THE DRAWINGS

The drawings diagrammatically illustrate by way of example, not by way of limitation, two forms of the invention.

DESCRIPTION OF THE INVENTION

The invention disclosed herein, the scope of which being defined in the appended claims, is not limited in its application to the details of construction and arrangement of parts shown and described for carrying out the disclosed methods, since the invention is capable of other embodiments for carrying out other methods and of being practiced or carried out in various other ways. Also, it is to be understood that the phraseology or terminology employed herein is for the purpose of description and not of limitation. Further many modifications and variations of the invention as hereinbefore set forth will occur to those skilled in the art. Therefore, all such modifications and variations which are within the spirit and scope of the invention herein are included and only such limitations should be imposed as are indicated in the appended claims.

GRANULAR MEDIA FILTER

Figure 1:
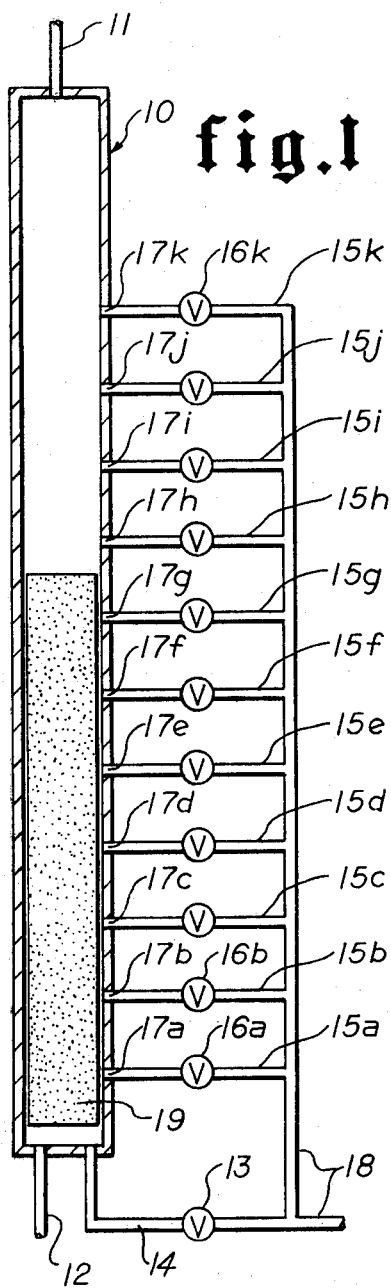
FIG. 1 is a schematic vertical view of a rapid fluidizing granular media vertical elongated filter with parts in section and with parts deleted for clarity of disclosure.

FIG. 1 illustrates one embodiment of the rapid fluidizing granular media vertical and plug-breaking-up filter 10 for practicing the methods of inventors co-pending co-assignee application filed concurrently herewith. This filter 10 is illustrated schematically as a vertical, cylindrical elongated chamber with filter influent entering from the top through conduit 11 and filter effluent is exhausted through lower conduit 12.

Backwash control valve 13 controls high pressure backwash water through conduit 14 and which backwash effluent may exit through conduit 11.

The main feature of the disclosed filters is a series of vertically, equally spaced apart, fluidizing lines $15a$–$15k$, each having a valve, as valve $16a$ and a nozzle, as nozzle $17a$ for ejecting a high pressure fluid stream or jet, such as, but not limited to, a water jet supplied from a central source main line 18. The valves 16 are operable in succession for being opened consecutively starting at either the bottom of the filter $10a$ and accordingly the bottom of a granular cake or plug 19 to be broken up and fluidized, or at the top of the plug and opened and closed in succession going down. The nozzles $17a$–$17k$ or plug-breaking-up means are in vertical alignment and spaced an equal predetermined distance apart. These plug-breaking-up nozzles comprise high velocity, narrow stream liquid nozzles, as distinguished from low pressure, low volume spray nozzles.

OPERATION

Briefly in operation of the rapid fluidizing granular media vertical filter 10, FIG. 1, with start of upward backwash flow, valve 16a is opened to supply line 15a and accordingly nozzle 17a, or plug-breaking-up means, with high pressure fluid or liquid jet which breaks up or fluidizes the lower portion of the plug 19 prior to rise of the plug due to the backwash. If the plug 19 has already raised or floated upwardly a small distance, then the first valve to open must be that one that will break up the lower portion of the plug.

Then after this plug lower portion is fluidized, the first valve 16a is turned off, the flow in the line 15a and nozzle 17a ceased, and the next valve 16b is opened. Then line 15b supplies the second nozzle 17b, spaced a predetermined distance above the first nozzle, with high pressure fluid to eject a jet against the remaining or next lower portion of the plug 19. After that plug lower portion is broken up or fluidized, the jet is ceased, and the next valve above is opened in succession. Thus the succeeding valves are opened and closed in succession until the last jet breaks up the last portion of the plug. No more valves are actuated.

Further, the valves are operable in succession likewise starting with the valve at the top of the plug which is opened first for its nozzle to break up the top portion of the plug. Then the succeeding valves below this valve at the top of the plug are opened and closed in succession to break up the plug from the top down during backwash operation.

Likewise the valves are operable, alternatively, so that after each valve is turned on, it remains on until the last portion of the plug is fluidized. Then all valves and their respective nozzles are turned off simultaneously.

Figure 3:
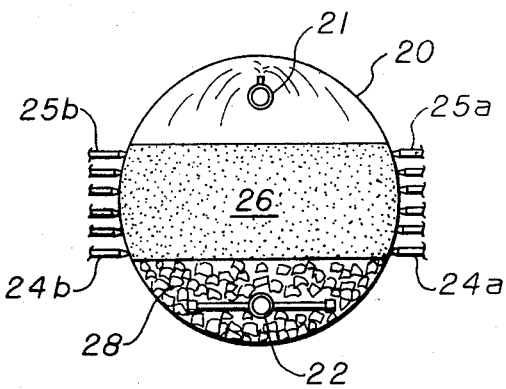
FIG. 3 is a sectional view of the modification of FIG. 2.
Figure 2:
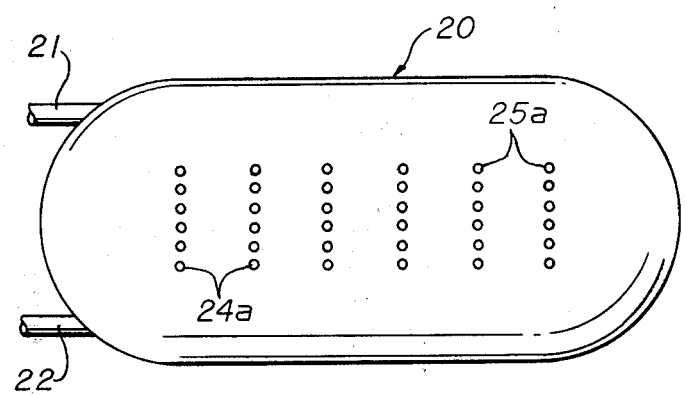
FIG. 2 is a schematic side view of a modified filter.
Figure 5:
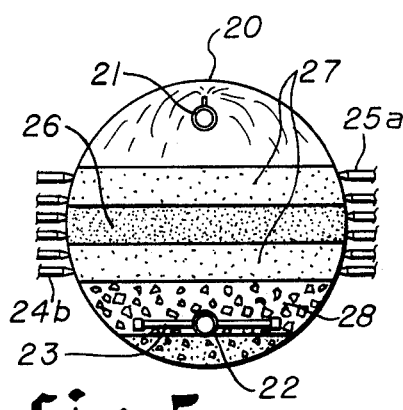
FIG. 5 is a sectional view of FIG. 4.
Figure 4:
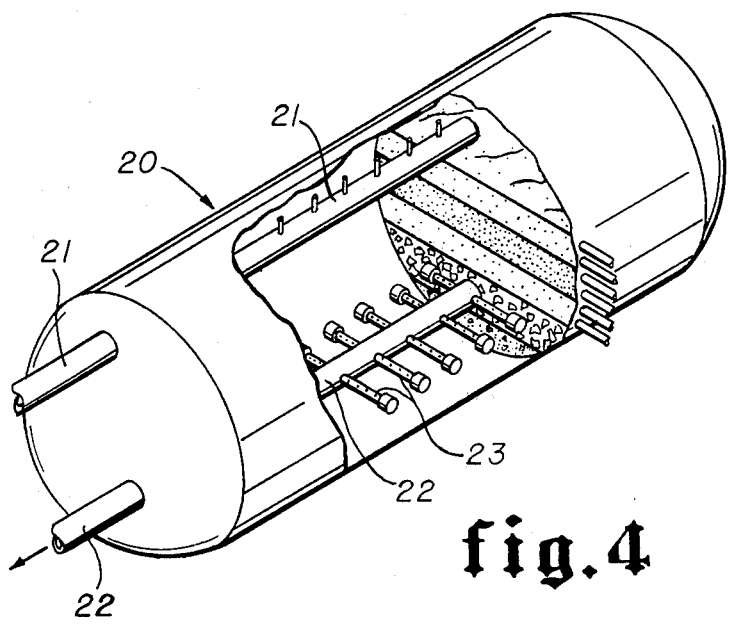
FIG. 4 is a schematic detailed perspective view of the modification of FIG. 2.

FIG. 2 illustrates in side view schematically, a modified filter for practicing the above described methods for fluidizing a filter media and particularly a filter media plug. FIG. 3 is a schematic end view of FIG. 2, FIG. 4 is a more detailed perspective view of the modified horizontal filter, and FIG. 5 is a detailed sectional view of FIG. 4. This filter comprises a horizontal cylinder 20, FIG. 4, particularly, having an inlet header 21 for supplying filter influent thereto and an underdrain header 22 with laterals 23 for discharge of the filter effluent. Backwash is controlled similarly to that in the first embodiment of FIG. 1.

Externally of the filter a first and lower horizontal row of plug-breaking-up fluidizing nozzles 24a and 24b is illustrated on FIG. 3 as being on opposite sides of the horizontal cylinder 20. More horizontal rows of nozzles are equally spaced above the bottom row to the top row of nozzles 25a and 25b. The individual nozzles of each horizontal row may form vertical rows of nozzles, equally spaced apart, on opposite sides of the horizontal cylinder 20. An elongated horizontal plug 26 may be formed internally of the cylinder in filter media 27 and resting on media support bed 28 comprising, for example, of rocks of decreasing size stacked on top of each other, or alternatively, it may comprise layers of coarse gravel, garnet sand, coarser sand, and coal for a top layer with the plug forming between the interfaces of the latter two layers.

In operation of the second embodiment of FIGS. 2-5, a liquid, such as but not limited to, water is squirted from the fluidizing nozzles at high pressure and high volume in contrast to the conventional low pressure low volume spray nozzles. The control system (not shown, but similar to that of FIG. 1) first turns on all of the nozzles in the bottom horizontal rows 24a and 24b on both sides simultaneously. After the bottom portion of the plug 26 contacted by the high pressure narrow streams of water is fluidized, this row of nozzles is cut off and simultaneously, the next higher row of nozzles is turned on and that remaining low plug portion is fluidized. This procedure is repeated until the upper and final portion of the plug is fluidized by the upper row of fluidizing nozzles 25a, 25b.

Likewise, if so desired and the filter so dictates, the first portion of the plug to be fluidized may be the upper portion by nozzles 25a, 25b, and the plug fluidizing worked down to the last remaining plug portion which is fluidized by the lower fluidizing nozzles 24a, 24b.

FIG. 5 is a detailed view of the sectional view of FIG. 3 illustrating an alternate breakdown of the plug 26. Here, the plug 26 is shown between two interfaces of the filter media 27. The underdrain header 22 is shown with its laterals 23 resting on a concrete rest for example and covered with the support media 28. Thus both the filter media 27 and the plug 26 may rise as one plug and all of which would be fluidized by the fluid nozzles.

Obviously other methods may be utilized for rapidly fluidizing a plug or filter media than those listed above, depending on the particular method and filter desired.

Accordingly, it will be seen that while the above disclosed horizontal and vertical filters may be different, these filters will operate in a manner which meets each of the objects set forth hereinbefore.

While only two modifications or embodiments have been disclosed, it will be evident that various other modifications are possible in the arrangement and construction of the disclosed filters without departing from the scope of the invention and it is accordingly desired to comprehend within the purview of this invention such modifications as may be considered to fall within the scope of the appended claims.

We claim:

1. In a rapidly fluidizing granular media filter having a plug of filter media therein which is required to be rapidly broken up and fluidized, the filter comprising,
   (a) chamber means having an inlet means for supplying a filter influent in the top thereof and an outlet means for discharging effluent from the bottom thereof in which a filter media plug is formed,
   (b) first plug-breaking-up means mounted on said chamber means at a predetermined distance above the bottom of said plug for ejecting a horizontal high pressure liquid jet at said plug for contacting and breaking up the lower portion of said plug,
   (c) a multiplicity of successive plug-breaking-up means for said vertical chamber means, each plug-breaking-up means being positioned a predetermined distance above the previous plug-breaking-up means to the top of said plug for rapidly breaking up and fluidizing said filter media plug, and
   (d) all of said plug-breaking-up means are mounted equal distances apart.

2. A rapidly fluidizing granular media filter as recited in claim 1 wherein,
   (a) all of said plug-breaking-up means are mounted in vertical alignment with each other.

3. A rapidly fluidizing granular media filter as recited in claim 1 wherein, (a) each of said plug-breaking-up means has valve means for ceasing fluid flow therein after its respective portion of said plug is broken up.

4. A rapidly fluidizing granular media filter as recited in claim 1 wherein,
(a) each of said plug-breaking-up means has valve means for ceasing fluid flow therein only after the last portion of said plug is broken up.

5. A rapidly fluidizing granular media filter as recited in claim 1 wherein,
(a) each of said plug-breaking-up means comprises means for ejecting a horizontal high pressure stream of liquid at said plug for breaking up and fluidizing its respective portion of said plug.

6. A rapidly fluidizing granular media filter as recited in claim 1 wherein,
(a) said chamber means is an elongated vertical cylindrical chamber, and
(b) said plug of filter media to be broken up is also a similarly shaped elongated vertical cylindrical plug.

7. A rapidly fluidizing granular media filter as recited in claim 1 wherein,
(a) said chamber means is an elongated longitudinal cylindrical chamber, and
(b) said plug of filter media to be broken up is also a similarly shaped elongated longitudinal cylindrical plug.

8. A rapidly fluidizing granular media filter as recited in claim 1 wherein,
(a) all of said plug-breaking-up means are positioned in a multiplicity of horizontal rows in vertical alignment with each other.

9. In a rapidly fluidizing granular media filter having a plug of filter media therein which is required to be rapidly broken up and fluidized, the filter comprising,
(a) chamber means having an inlet means for supplying a filter influent in the top thereof and an outlet means for discharging a filter effluent from the bottom thereof in which a filter media plug is formed,
(b) first plug-breaking-up means for said chamber means at a predetermined distance below the top of said plug for ejecting a horizontal high pressure liquid jet at said plug for contacting and breaking up the upper portion of said plug,
(c) second plug-breaking-up means for said chamber means at a predetermined distance below said first and previous plug-breaking-up means for ejecting a horizontal high pressure liquid jet at said plug for breaking up the next upper portion of said plug,
(d) a multiplicity of successive plug-breaking-up means for said chamber means, each plug-breaking-up means being positioned a predetermined distance below the previous plug-breaking-up means to the bottom of said plug for rapidly breaking up and fluidizing said filter media plug, and
(e) all of said plug-breaking-up means are mounted equal vertical distances apart and equal horizontal distances apart.

10. A rapidly fluidizing granular media filter as recited in claim 9 wherein,
(a) all of said plug-breaking-up means are positioned in vertical alignment with each other.

11. A rapidly fluidizing granular media filter as recited in claim 9 wherein,
(a) each of said plug-breaking-up means has valve means for ceasing liquid flow therein after its respective portion of said plug is broken up.

12. A rapidly fluidizing granular media filter as recited in claim 9 wherein,
(a) each of said plug-breaking-up means comprises means for ejecting a horizontal high pressure stream of liquid at said plug for breaking up and fluidizing its respective portion of said plug.

13. A rapid fluidizing granular media filter as recited in claim 9 wherein,
(a) all of said plug-breaking-up means are positioned in a multiplicity of horizontal rows in vertical alignment with each other.

* * * * *